United States Patent
Durif (10) Patent No.: US 7,380,450 B2
(45) Date of Patent: Jun. 3, 2008

(54) DEVICE FOR FIXING A MODULE TO THE SURFACE OF A TIRE

(75) Inventor: Pierre Durif, Enval (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 221 days.

(21) Appl. No.: 11/418,950

(22) Filed: May 5, 2006

(65) Prior Publication Data

US 2006/0201241 A1 Sep. 14, 2006

Related U.S. Application Data

(63) Continuation of application No. PCT/EP2004/012533, filed on Nov. 5, 2004.

(30) Foreign Application Priority Data

Nov. 5, 2003 (FR) .................................. 03 13081

(51) Int. Cl.
*G01M 17/02* (2006.01)
(52) U.S. Cl. ...................................................... 73/146
(58) Field of Classification Search ....... 73/146–146.8; 340/442–444
See application file for complete search history.

(56) References Cited

U.S. PATENT DOCUMENTS

| | | | | |
|---|---|---|---|---|
| 5,798,689 A * | 8/1998 | Huang | ......................... | 340/447 |
| 5,945,908 A * | 8/1999 | Nowicki et al. | ............ | 340/447 |
| 6,175,301 B1 * | 1/2001 | Piesinger | .................... | 340/442 |
| 6,192,746 B1 * | 2/2001 | Wilson | ........................ | 73/146 |
| 6,782,741 B2 * | 8/2004 | Imbert | ........................ | 73/146.5 |
| 7,186,308 B2 * | 3/2007 | Metcalf et al. | ............. | 156/123 |

\* cited by examiner

*Primary Examiner*—Edward Lefkowitz
*Assistant Examiner*—Jermaine Jenkins
(74) *Attorney, Agent, or Firm*—Fitzpatrick, Cella, Harper & Scinto (57) ABSTRACT

An assembly for fixing a module to a surface of a tire. The assembly includes a base having a sole plate with a mounting face, for permanent connection to the surface of the tire and a bearing face. The base also has holding means for holding the module in place on the bearing face. The holding means includes a resilient strap located opposite the bearing face of the sole plate and connected to the sole plate by two opposite ends of the resilient strap. A case encloses the module, and the casing is, under normal operating conditions of the tire, held in place between the strap and the bearing face of the sole plate by resilient restoring forces developed by the resilient strap.

20 Claims, 6 Drawing Sheets

DEVICE FOR FIXING A MODULE TO THE SURFACE OF A TIRE

CROSS-REFERENCE TO RELATED APPLICATIONS

This application is a continuation of International Application PCT/EP2004/012533, filed Nov. 5, 2004, which claims priority to French Patent Application 03/13081, filed Nov. 5, 2003, both of which are incorporated herein by reference in their entirety.

BACKGROUND OF THE INVENTION

1. Field of the Invention

The invention relates to a device for removably fixing an electronic module to the surface of a tire.

2. Description of Related Art

The use of electronic modules in tires makes possible a wide range of applications including the acquisition, storage and transmission of information in order to track manufacturing or logistics, and more generally informing the user of changes in performance of the tire over the course of its service life.

This electronic module may comprise passive components, such as identification chips or RFID chips, and/or active components connected to an independent system for supplying electrical energy, such as batteries, or indeed an inductive coupling system, which does not form part of the invention. The modules are designed to exchange the desired information with external modules, serving as an interface with the user, by way of radio waves, the frequency and power of which are carefully adjusted to specific transmission protocols. The modules are generally disposed inside flexible or rigid protective casings which are intended to protect the electronic components from shocks and the environment prevailing in and around the tire.

The module, which by way of example is positioned inside the cavity formed by the tire once the tire is mounted on the wheel, may be disposed on a wide variety of supports. Thus, it may be fixed to the valve or to the rim, fixed or glued to the inner wall of the tire cover, or indeed integrated within the components of the tire. The selection of one of these solutions depends on the type of tire and the stresses it must undergo, the type of power source for the electronic module, the information which is to be tracked and the desired accessibility for maintenance.

One of the difficulties to be resolved by those skilled in the art taking on these problems relates to overcoming possible interference between the radio waves and the components of the wheel or the tire. This problem proves particularly difficult to solve if one of these electronic modules is to be disposed inside a tire having metal carcass reinforcement plies.

In this latter case, the solution consists of disposing the module as close as possible to the wall of the tire, while taking into account the flexibility of the tire and the relative rigidity of the module, the resistance to shocks, the possibility of removing the module in order to perform maintenance on it, and the need to ensure that the module is kept in position whatever the speed of rotation and the conditions of use of the cover.

Ways of fixing the module to the tire which allow these requirements to be met are described, for example, in the publication EP 0 936 089 (which corresponds to U.S. Pat. No. 6,030,478), U.S. Pat. No. 6,255,940 or indeed U.S. Pat. No. 6,462,650, which describe systems for fixing a module to the inner wall of a tire. These devices are composed of a flexible sole plate, of which one face serves to provide a connection to the inner wall of the tire and the other face has a fixing means which cooperates with the attachment means disposed on the module.

However, all the solutions proposed in the publications discussed above relate to devices in which the base that serves to provide a connection between the inner wall of the tire and the module proper is relatively bulky and has, in particular, protruding means of connection to the module.

This latter characteristic is particularly inconvenient when the tire has to undergo retreading in the hot condition, since this base and the means of connection to the module associated therewith run the risk of damaging the wall of the curing membranes used for this operation. Added to this inconvenience is the fact that there are local variations in the heat exchange conditions.

It thus becomes necessary to remove this base by grinding it away before the step of vulcanization and, given the destructive nature of the grinding operation, to replace the base after the vulcanization operations are complete.

SUMMARY OF THE INVENTION

The object of the invention is to reduce the difficulties set out above by proposing an assembly having a fixed base on the inner wall of a tire and a removable module held in place by the base. The features of the base are specifically adapted so that they do not obstruct the operations of retreading the covers in the hot condition.

More particularly, the invention relates to an assembly composed of a removable module and a fixing base, this assembly being intended to be fixed to the surface of a tire. The fixing base includes a sole plate having a mounting face intended to be permanently connected to the surface of the tire and a bearing face, and means of holding the module in place. The module includes at least one electronic component and a casing in which the component at least partially engages.

This assembly is characterized in that the means of holding in place includes a resilient strap located opposite the bearing face of the sole plate and connected to the sole plate by two opposite ends of its contour; and in that the shape and dimensions of the casing, the sole plate and the strap are provided such that it is possible to position the casing in at least one position in which the casing is, under normal operating conditions of the tire, held in place between the strap and the bearing face of the sole plate by resilient restoring forces developed by the resilient strap.

The shape of the casing of the module is adapted to cooperate with the specific profile of the base so that the module is held in place whatever the conditions of travel.

These bases are made from thin strips of rubber mix, the profile of which has the particular feature that it has no parts capable of damaging a curing membrane, and the presence of the thin strips on the inner surface of the tire does not significantly alter the local conditions of heat exchange during a curing operation. Once it is permanently fixed to the inner surface of the tire there is no longer any need to grind away the base before a retreading operation in the hot condition.

BRIEF DESCRIPTION OF THE DRAWINGS

The advantages and details of features of this type of base will emerge from reading the present description and from the examples or variant embodiments according to the invention, given with reference to the diagrams and drawings, in which.

In the text below, the same reference numerals will be used to designate identical or equivalent elements shown in FIGS. 1 to 20.

DETAILED DESCRIPTION OF THE PREFERRED EMBODIMENT

Figure 1:
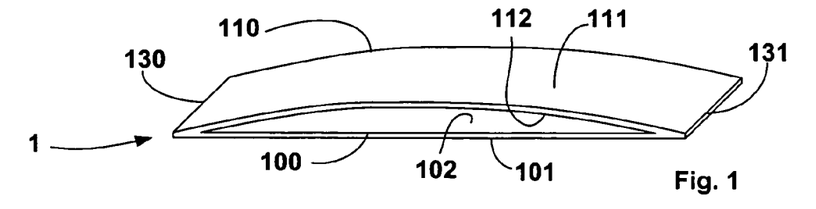
FIG. 1 shows a simplified diagrammatic view of a base including a sole plate and a resilient strap.

The base 1 as shown in FIG. 1 is formed by a sole plate 100 and a resilient strap 110 which is generally rectangular in shape. These two parts are connected to one another at part of their contours 130 and 131, so that a closed-loop strip is formed.

The sole plate 100 and the resilient strap 110 are formed from pieces of thin elastomer material. It has been found particularly advantageous to reduce the total thickness of the base to the minimum possible in order to minimize local effects during the retreading operation in the hot condition, during which heat exchanges are performed by way of the inner surface of the tire, inside which a curing membrane has previously been deployed. In practice, the thickness of the sole plate 100 or the resilient strap 110 is less than 5 mm, more particularly between 1 and 2 mm.

The sole plate 100 is intended to be permanently connected, by means of its mounting face 101, to the surface of a tire. To this end, it may be formed by one or more layers of materials whereof the properties are suitable for the conditions of adhesion between the sole plate 100 and the sealing rubber of the tire, and between the sole plate 100 and the resilient strap 110.

In most cases, the base is fixed to the inner surface of the tire. However, fixing it to an outer surface of the tire may readily be envisaged. The glue or the rubber mix providing the connection between the mounting face of the sole plate and the surface of the tire will be determined from this. For example, it is possible to use a silicone glue. It is also possible to make the connection by hot or cold vulcanization of rubber mixes well known to those skilled in the art.

Figure 20:
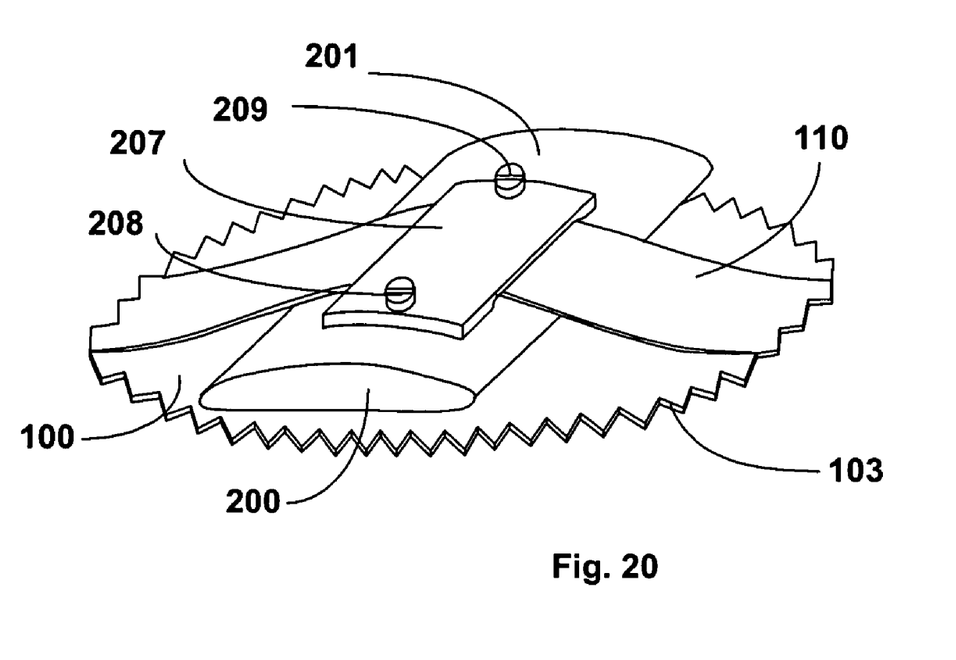
FIG. 20 shows a simplified diagrammatic view of a module and a base having a zigzag-shaped contour.

In order to ensure better maintenance over time of the adhesion between the mounting face 101 and the surface of the tire, it is possible to provide pinking around the contour of the sole plate 100. This pinking may be undulating in shape, or indeed zigzagged 103 as shown in FIG. 20.

The module 2 is composed of a casing 200 which encloses all or part of an electronic component (not illustrated). The casing 200 includes a back 203 intended to cooperate with the inner surface of the resilient strap 112, and an underside formed by one or more feet 201, 202 which are intended to come into contact with the bearing face of the sole plate 102.

Figure 2:
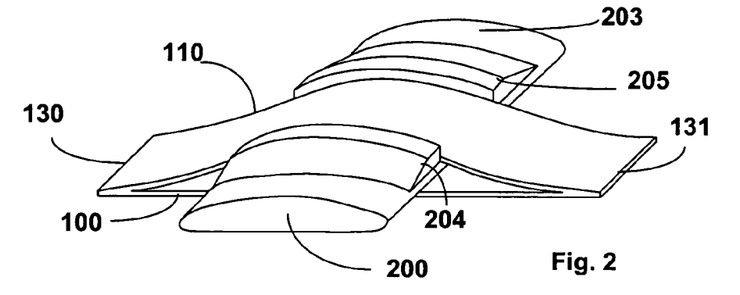
FIG. 2 shows a simplified diagrammatic view of a base including a sole plate and a resilient strap into which a module has been introduced.
Figure 3:
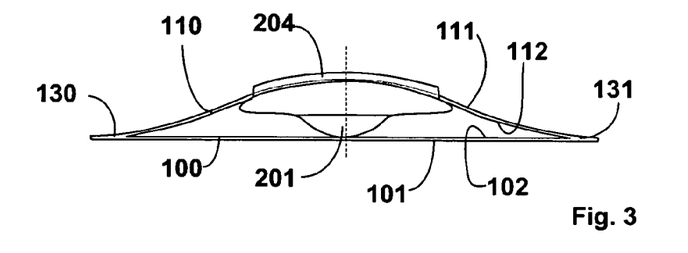
FIG. 3 shows an end view of a base including a sole plate and a resilient strap into which a module has been introduced.
Figure 4A:
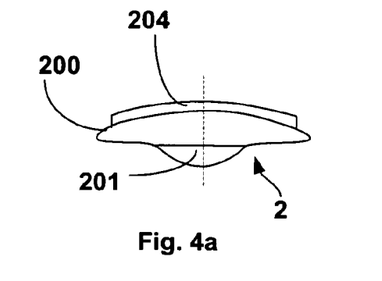
FIGS. 4a and 4b show an end view and a profile of a module capable of cooperating with a base such as that shown in FIGS. 1, 2 and 3.
Figure 4B:
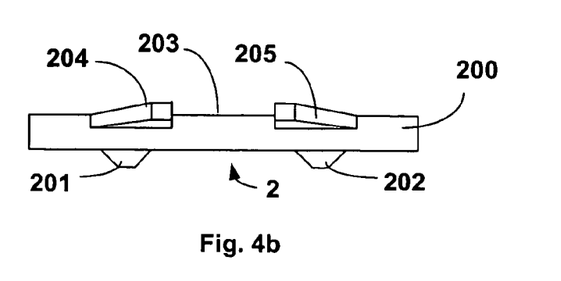

The resilient strap 110 is intended to hold in place the casing of the module 200 which has previously been introduced between the bearing face of the sole plate 102 and the inner face 112 of the resilient strap 110, as illustrated in FIG. 2 or FIG. 3. A material having resilient properties suited to this function must therefore be sought. In practice, although this is not restrictive, the modulus of elasticity of these materials will generally be between 0.5 MPa and 5 MPa for an elongation of 10%. When the module is introduced into the base, the resilient strap 100 is tensioned resiliently, and the resultant of these forces exerts restoring forces on the back 203 of the casing 200 of the module so that the bearing feet 201, 202 as illustrated in FIGS. 3, 4a and 4b are in permanent contact with the bearing face 102 of the sole plate 100.

The rubber mix forming the strap 110 will preferably be resistant to flow and to the environmental conditions to which the base is subject.

Experiments have shown that to obtain good results in endurance tests, an anchoring rubber mix containing at least one synthetic elastomer from the family including EPDMs, SBRs, polybutadienes or butyls may be used. The rubber mix moreover contains reinforcement fillers such as carbon black and a vulcanization system which are suitable for obtaining the desired rigidity, and additives such as antioxidants in appropriate quantities. These mixes have good resistance to flow and to oxidation.

Figure 5:
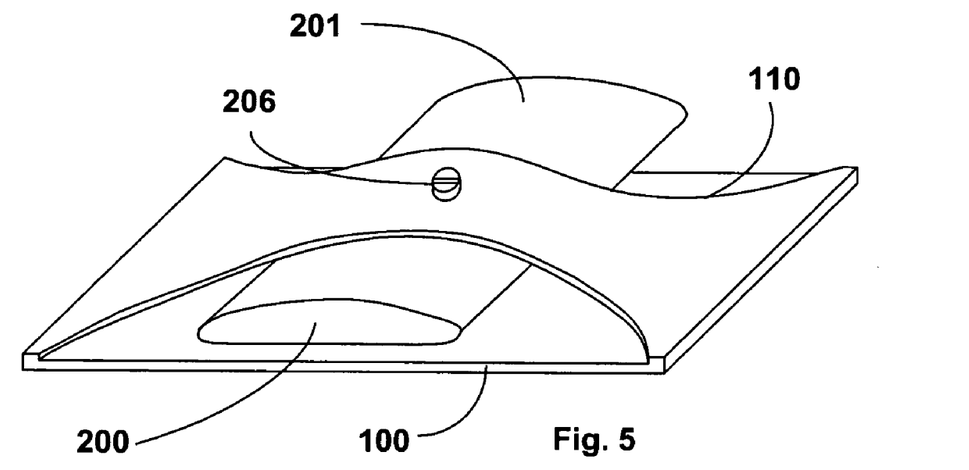
FIG. 5 shows a simplified diagrammatic view of a first variant for fixing on a base, that includes a variant embodiment of the sole plate and a resilient strap.
Figure 6:
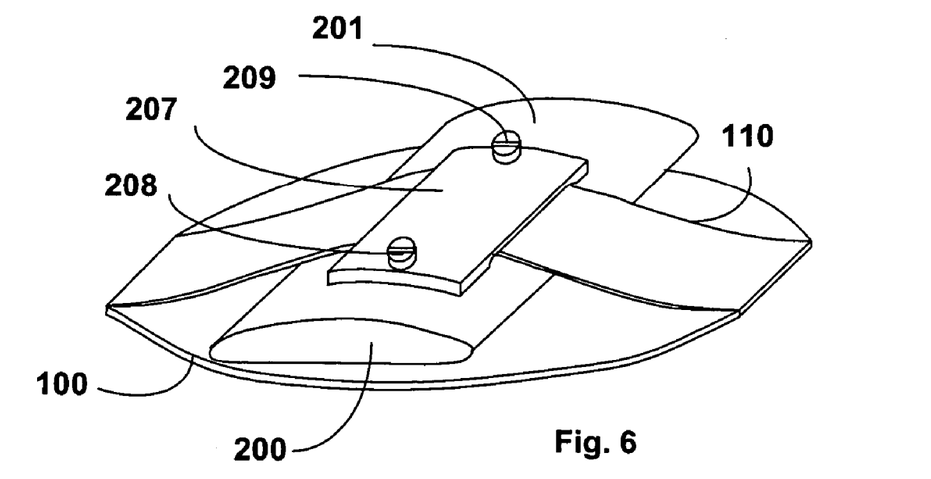
FIG. 6 shows a simplified diagrammatic view of a second variant for fixing on a base, including another variant embodiment of the sole plate and the resilient strap.

A rectangular shape for the sole plate or the resilient strap 100 has proved to be the most convenient for making and fixing the sole plate to the inner surface of the tire and for introducing the module. However, without departing from the spirit of the invention, this shape may be adapted to meet the demands of adhesion or bulk at the point of adhesion to the inner surface of the tire, as illustrated in FIGS. 5 and 6. Thus, the width of the resilient strap 110 may be smaller in some parts than the width of the sole plate 100.

Made in this way, the base 1 is capable of holding in place a module 2, 3 of any shape. In practice, however, it has proved necessary to adapt the shape of the casing 200, inside which the electronic part proper of the module is clasped, so that holding in place of the module is ensured whatever the conditions of travel of the tire. It is advisable to avoid any risk that the module will come out once it has been introduced between the bearing face of the sole plate 102 and the inner face of the resilient strap 112 of the base. To this end, it is possible to provide shoulders 204 and 205 on the back 203 of the body of the module, between which the resilient strap is arranged in order to prevent any possibility that the module will slide out of the base. The spacing between the two shoulders will be adapted to correspond substantially to the width of the resilient strap 110 in the zone of contact between the resilient strap 110 and the back 203 of the casing 200.

Moreover, the attempt should be made to adapt the shape of the underside of the casing of the module 200, 300, 400 in contact with the bearing face of the sole plate 102, so that premature wear of these contact surfaces, resulting from the differences in the viscoelastic properties between the casing of the module and the tire, are avoided. The casing of the module should thus be rested on one or more bearing feet 201, 202, 301, 302, 401, 402 as illustrated, by way of example, in FIGS. 3, 4a and 4b, 9, 10a and 10b, 13, 14a and 14b or indeed in FIGS. 17, 18 and 19, whereof the shape will be adapted advantageously so that there is a convex contact surface which is not aggressive towards the bearing face of the sole plate 102 or the inner surface of the tire, whatever vibrations arise in the module or whatever deformations the tire undergoes in the zone where the base and the module are disposed, each time the tire rotates. In practice, the variations in curvature in this contact surface will as far as possible be progressive, so that they do not have sharp or aggressive edges giving rise to localized positive pressure. The number of bearing feet will preferably be between one (FIGS. 10a, 10b, 14a, 14b, 18, 19) and two (FIGS. 4a, 4b) so that the greatest possible independence of movement of the module 2, 3, 4 with respect to the tire is possible during use.

It is also possible, without departing from the scope of the invention, and using a base including a sole plate and a resilient strap, to dispense with the shoulders 204, 205 and to fix the module in a different way.

A first variant on fixing the module includes providing a removable fixing means. This means may be formed, by way of example, by a screw 206 passing through the resilient strap 110 and a thread made in the body of the module, as illustrated in FIG. 5.

A second variant on fixing the module may include covering all or part of the outer face 111 of the resilient strap in the contact zone between the back 203 of the casing of the module 200 and the resilient strap 110 with the aid of a means 207 which follows the shape of the casing and is held on the latter with the aid of removable fixing means, such as fixing screws 208, 209, firmly immobilizing the resilient strap 110 between the means 207 and the back 203 of the casing of the module, as illustrated in FIG. 6.

It is also possible to arrange the holding feet 201 and 202 at a spacing such that they clasp the sole plate 100 between their points of contact with the inner surface of the tire (not illustrated). However, this embodiment does not enable perfect holding in place if the intention is to minimize the height of the sole plate 100.

Figure 7:
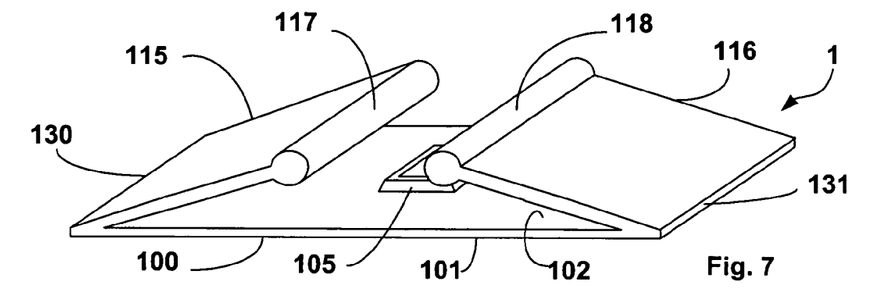
FIG. 7 shows a simplified diagrammatic view of a base including a sole plate and a resilient strap divided into two sub-parts.
Figure 8:
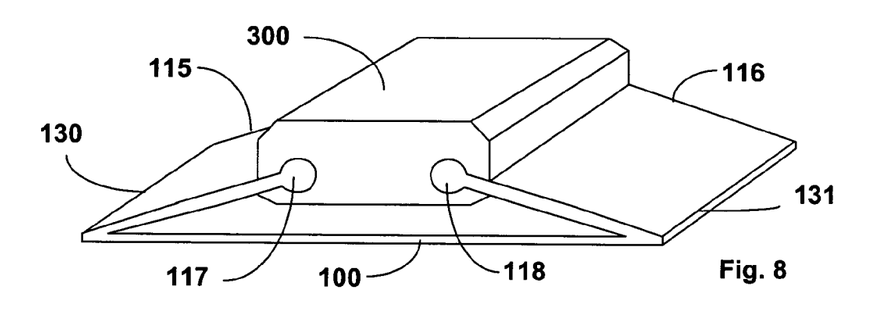
FIG. 8 shows a simplified diagrammatic view of a base including a sole plate and a resilient strap divided into two sub-parts, into which a module has been introduced.

A second variant embodiment, and one which is particularly robust, for bringing about cooperation between a resilient strap and the casing of the module 3 includes making a base in which the resilient strap is divided into two sub-parts 115, 116. The features of the sole plate 100 are similar to those described above. The two sub-parts of the resilient strap 115 and 116 respectively are disposed facing one another and connected to the sole plate by a part of their contours 130 and 131 respectively, as illustrated in FIG. 7.

Each of the other two ends 117, 118 of the two sub-parts of the resilient strap are anchored to the casing 300 of the module 3 so that the restoring forces of the strap 115, 116 are transmitted to the casing 300 of the module.

By way of example, an embodiment of this variant includes providing a holding rod 117, 118 at the ends of each of the two sub-parts of the resilient strap 115 and 116; the holding rods 117, 118 are disposed opposite the connection 130, 131 between the sole plate 100 and each of the sub-parts 115, 116 of the resilient strap. The rod may be cylindrical in shape, or of any other suitable shape.

The casing 300 of the module 3 has two receivers 303 and 304 respectively which are located laterally on either side of the casing and have a profile adapted to receive the holding rods 117 and 118, as illustrated in FIGS. 10a, 10b, 14a and 14b. Introducing the holding rods 117 and 118 into the receivers 303 and 304, respectively, ensures that the module 300 is kept upright and in contact with the bearing face 102 of the sole plate 100.

To do this, the length and resilience of the sub-parts of the resilient strap 115, 116 must be adapted accordingly.

Figure 9:
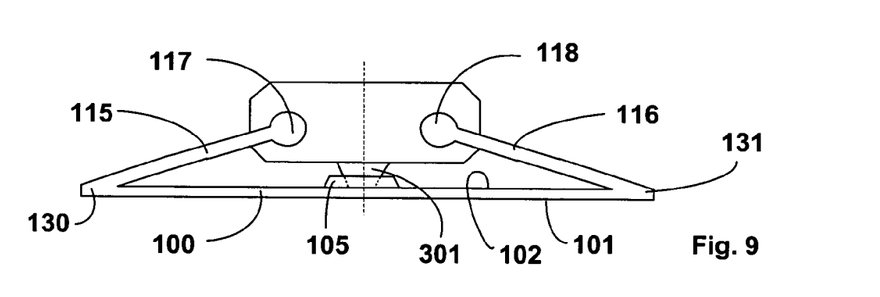
FIG. 9 shows an end view of the base including a sole plate and a resilient strap divided into two sub-parts, into which a module has been introduced.
Figure 10A:
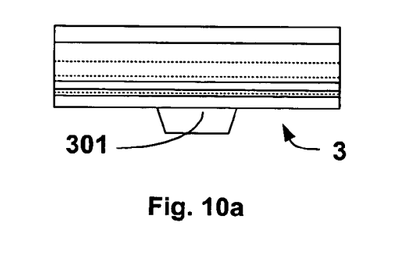
FIGS. 10a and 10b show an end view and a profile of a module capable of cooperating with a base such as that shown in FIGS. 7, 8 and 9.
Figure 10B:
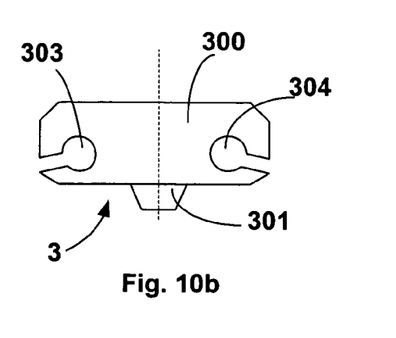
Figure 11:
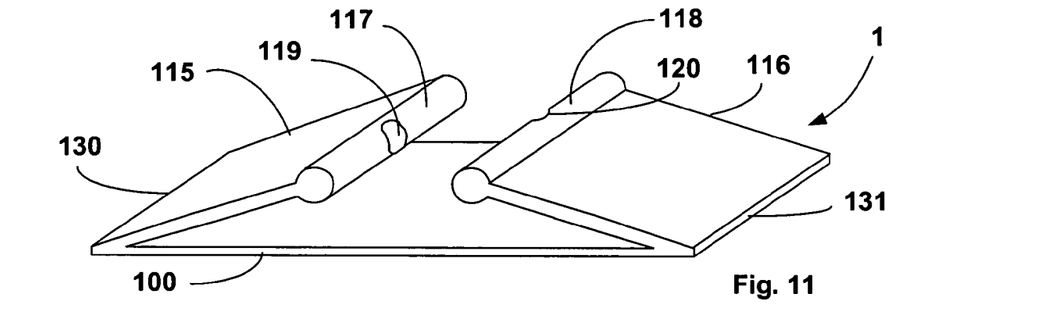
FIG. 11 shows a simplified diagrammatic view of a base for a third variant for fixing on a base.
Figure 12:
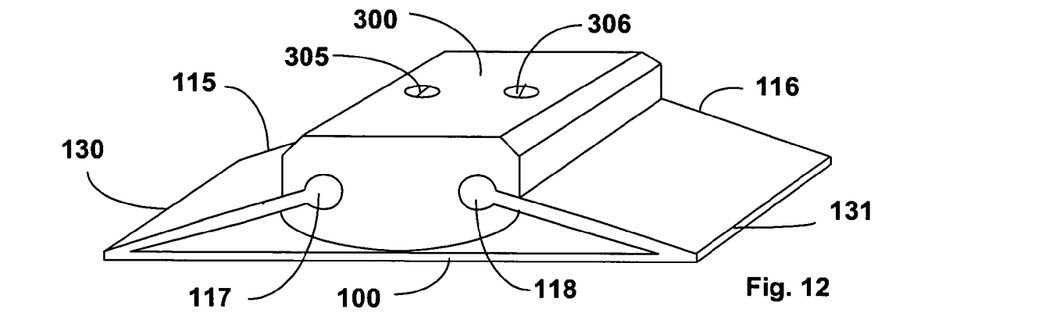
FIG. 12 shows a simplified diagrammatic view of a base into which a module has been introduced, in accordance with a third variant for fixing on a base.
Figure 13:
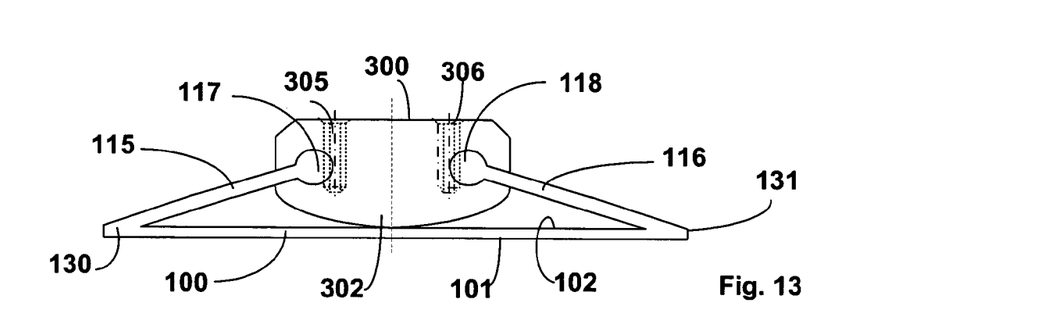
FIG. 13 shows an end view of the base shown in FIG. 12, FIGS. 14a and 14b show an end view and a profile of a module capable of cooperating with a base such as that shown in FIGS. 11, 12 and 13.
Figure 14A:
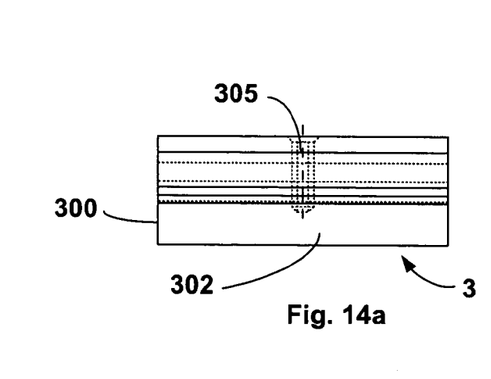
Figure 14B:
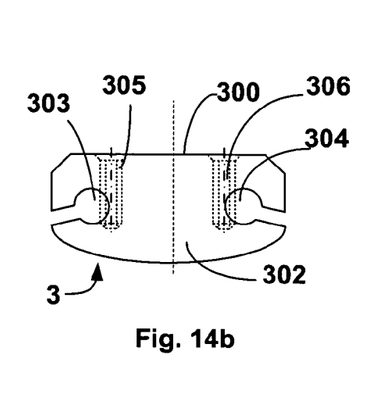

Once the module is mounted, the two sub-parts 115 and 116 of the resilient strap are put under resilient tension, and the resultant of these forces exerts restoring forces which are transmitted, as a result of the fact that the holding rods 117, 118 are fitted into the receivers 303, 304, to the casing of the module so that the bearing feet 301, 302 illustrated in FIGS. 9 and 13 are in permanent contact with the bearing face 102 of the sole plate 100.

Similarly, and for the same reasons as those described above, it is recommended to provide one or more bearing feet 301, 302 on that part of the casing which is in contact with the bearing face of the sole plate or the inner surface of the tire. These bearing feet must be adapted to have a contact surface which is as unaggressive as possible.

It may also prove necessary, in order to limit movement of the module, to provide slightly elevated portions 105 on the bearing face 102 of the sole plate 100 which are intended to cooperate with the bearing feet 301, as shown in FIG. 7 or 9, preventing the foot from slipping on the bearing face 102 of the sole plate. In practice, the height of these elevated portions 105 does not exceed 1 to 2 mm. This elevated portion 105 may be made such that it surrounds the contact zone of the bearing foot, as shown in FIG. 7 or FIG. 9, but it may also take the form of a slight boss (not shown) on which the foot comes to bear, the concave shape of this foot corresponding, at the point of contact with the second face 102 of the sole plate, to the shape of the boss made on the latter.

It should be noted that these provisions may be applied to any type of resilient strap of the base.

It is also possible, in this configuration of the resilient strap, to use a third variant on removable fixing of the module. To this end, apertures 119, 120 may be made in the holding rods 117, 118 and may cooperate with fixing screws 305, 306 provided in the body of the module, as illustrated in FIGS. 11, 12, 13, 14a and 14b.

Figure 15:
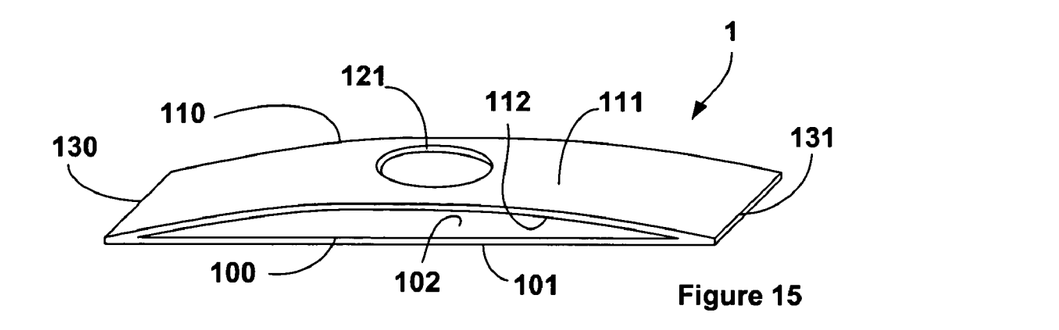
FIG. 15 shows a simplified diagrammatic view of a base including an opening.
Figure 16:
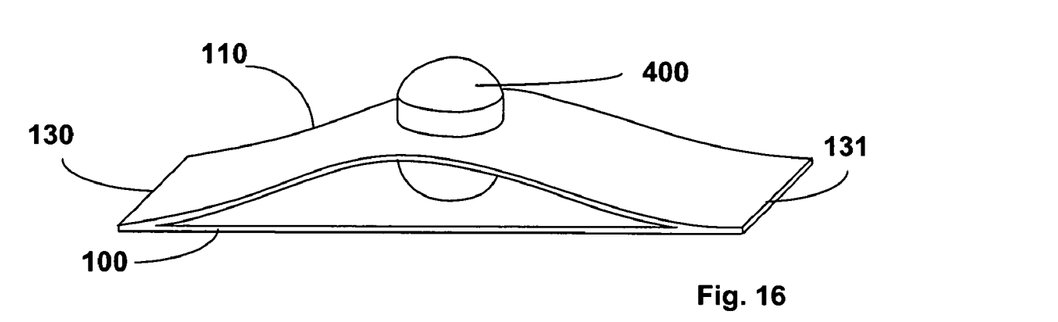
FIG. 16 shows a simplified diagrammatic view of a base having an opening, into which a module has been introduced.
Figure 17:
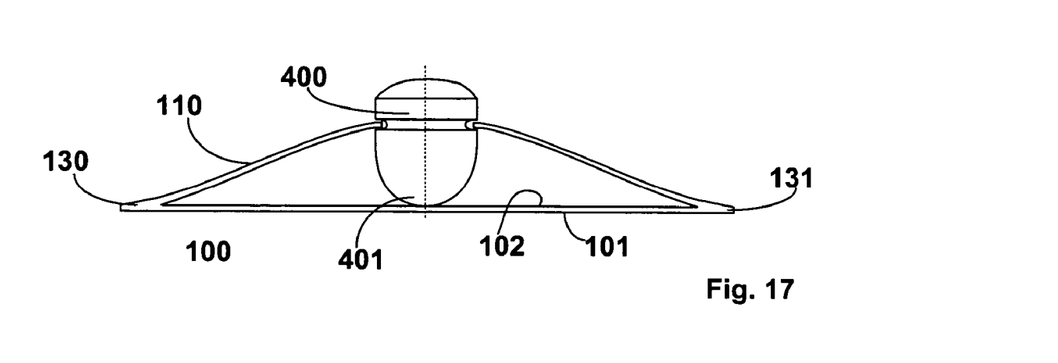
FIG. 17 shows an end view of a base as shown in FIG. 16.
Figure 18:
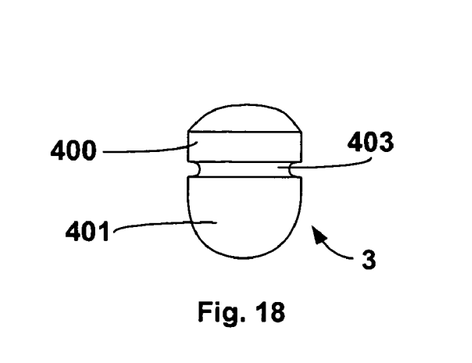
FIG. 18 shows an end view of a module adapted for a base having an opening.

A third variant embodiment on the means of bringing about cooperation between the resilient strap 1 and the module 4 includes making an opening 121 in the resilient strap, as illustrated in FIG. 15. The edges of the opening are adapted so that they clasp an advantageously selected contour of the casing 400 of the module, as illustrated in FIGS. 16 and 17. To hold the module in place better, it is advantageous to provide a groove 403 in the casing 400, intended to receive the edges of the opening made in the resilient strap, as illustrated in FIG. 18. The module 4 is introduced into the opening by working on the resilience of the material used to make the resilient strap. Once the module is in position, the resilient strap is put under tension and firmly holds the module in place at the groove 403, while exerting on the module the restoring forces required to maintain the contact between the bearing foot 401 of the module 400 and the bearing face 102 of the sole plate 100.

The circular shape of the opening is given here by way of example, and may equally be adapted to a particular shape of the casing of the module.

Figure 19:
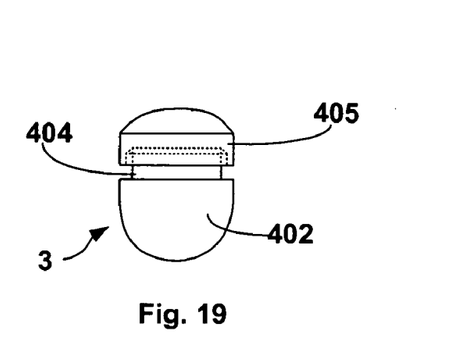
FIG. 19 shows an end view of a module adapted for a base having an opening and including a fourth variant for fixing on a base.

An alternative embodiment include supplying the casing with a removable cap 405 which may be screwed onto the body of the casing. Once the body of the module is in position, it is possible to fix the module to the resilient strap, as illustrated in FIG. 19, by screwing the cap 405 onto the body of the casing. This variant may prove particularly advantageous for easy access to the battery powering the module.

The example embodiments of the principles of the invention, namely the capacity of a resilient membrane put under tension to hold in place the module pressed against the inner wall of a tire, allow those skilled in the art to combine at will, without departing from the spirit of the invention, each of the variant embodiments, illustrated in the description above, of the sole plate, the resilient strap, the bearing feet or the removable fixing means.

What is claimed is:

1. An assembly for fixing a module to a surface of a tire, the assembly comprising:
    a base comprising:
        a sole plate having a mounting face for permanent connection to the surface of the tire and a bearing face; and
        holding means for holding the module in place on the bearing face, the holding means including a resilient strap located opposite the bearing face of the sole plate and connected to the sole plate by two opposite ends of the resilient strap; and
    a casing enclosing the module,
    wherein the casing is, under normal operating conditions of the tire, held in place between the strap and the bearing face of the sole plate by resilient restoring forces developed by the resilient strap.

2. An assembly according to claim 1, in which the resilient restoring forces developed by the resilient strap are such that the casing is in constant contact with the resilient strap and the bearing face of the sole plate when the tire is used in normal operating conditions.

3. An assembly according to claim 1, in which the base and the casing are adapted to allow the module to be put in position by insertion between the resilient strap and the bearing face of the sole plate.

4. An assembly according to claim 3, wherein the casing includes a back adapted to be in contact with the resilient strap and having shoulders disposed facing one another, between which the resilient strap is positioned, the shoulders having a spacing substantially corresponding to a width of the resilient strap in a zone of contact between the resilient strap and the back of the casing.

5. An assembly according to claim 1, wherein the resilient strap is divided into two sub-parts which are disposed facing one another, each of the sub-parts being connected to the sole plate by an end of the sub-part and anchored to the casing by an opposite end of the sub-part, so that the restoring forces of the resilient strap are transmitted to the casing.

6. An assembly according to claim 5, wherein the sub-parts of the resilient strap are connected to the casing by holding rods disposed at the end of each sub-part, with the holding rods being introduced into grooves in the casing.

7. An assembly according to claim 1, wherein the resilient strap has an opening configured to fit a contour of the casing.

8. An assembly according to claim 7, wherein a groove is provided on the contour of the casing, the groove being configured to receive an edge of the opening in the resilient strap.

9. An assembly according to claim 1, wherein the casing comprises bearing feet, on an underside of the casing, adapted to contact the bearing face of the sole plate, and the bearing face comprises one or more elevated portions adapted to cooperate with the bearing feet.

10. An assembly according to claim 9, wherein the bearing feet comprise a convex surface with a progressive curvature.

11. An assembly according to claim 1, wherein a width of the resilient strap is smaller, in at least one portion, than a width of the sole plate.

12. An assembly according to claim 1, further comprising means for attaching the resilient strap to the back of the casing.

13. An assembly according to claim 12, wherein the means for attaching comprises a screw.

14. An assembly according to claim 1, wherein the sole plate and the resilient straps are formed from a piece of elastomer material less than 5 mm thick.

15. An assembly according to claim 1, wherein the sole plate and the resilient straps are formed from a piece of elastomer material less than 2 mm thick.

16. An assembly according to claim 1, wherein the resilient strap is formed of an elastomer material comprising a rubber mix including at least one synthetic elastomer selected from the group comprising EPDMs, SBRs, polybutadienes, and butyls.

17. An assembly according to claim 1, wherein an external contour of the sole plate is of an undulating shape.

18. An assembly according to claim 1, wherein an external contour of the sole plate is of a zigzag shape.

19. An assembly according to claim 1, further comprising a tire.

20. A fixing base for fixing a module to a surface of a tire, the fixing base comprising:
    a sole plate having a mounting face for permanent connection to the surface of the tire and a bearing face; and
    holding means for holding the module in place on the bearing face, the holding means including a resilient strap located opposite the bearing face of the sole plate and connected to the sole plate by two opposite ends of the resilient strap,
    wherein the holding means is configured to secure a casing of the module, under normal operating conditions of the tire, between the strap and the bearing face of the sole plate by resilient restoring forces developed by the resilient strap.

* * * * *